(12) United States Patent
Go

(10) Patent No.: US 7,408,792 B2
(45) Date of Patent: Aug. 5, 2008

(54) INVERTER AND INVERTER DRIVING METHOD FOR ENABLING SOFT START OF A LOAD

(75) Inventor: Gwang Mi Go, Gumi-si (KR)

(73) Assignee: LG Electronics Inc., Seoul (KR)

( * ) Notice: Subject to any disclaimer, the term of this patent is extended or adjusted under 35 U.S.C. 154(b) by 44 days.

(21) Appl. No.: 11/241,994

(22) Filed: Oct. 4, 2005

(65) Prior Publication Data

US 2006/0072351 A1 Apr. 6, 2006

(30) Foreign Application Priority Data

Oct. 4, 2004 (KR) ............... 10-2004-0078665

(51) Int. Cl.
*H02M 7/517* (2006.01)
*H05B 39/02* (2006.01)
(52) U.S. Cl. .................... 363/49; 323/901
(58) Field of Classification Search .......... 363/20, 363/21.01, 21.04, 21.09, 21.12, 21.17, 49, 363/97, 131; 315/209 R, 219
See application file for complete search history.

(56) References Cited

U.S. PATENT DOCUMENTS

| 4,104,715 | A * | 8/1978 | Lawson, Jr. | 363/37 |
| 6,259,615 | B1 * | 7/2001 | Lin | 363/98 |
| 6,853,565 | B1 * | 2/2005 | Liao | 363/56.11 |

* cited by examiner

*Primary Examiner*—Gary L Laxton
(74) *Attorney, Agent, or Firm*—KED & Associates, LLP

(57) ABSTRACT

An inverter and inverter driving method enable slow start of a load by gradually increasing the lamp current within a range less than a predetermined maximum level, thereby preventing improper operation of the inverter. The inverter includes a transformer for converting a DC input voltage into an AC output voltage, an inverter control unit for controlling a level of the AC output voltage from the transformer in response to a feedback current from a load driven by the AC output voltage, and a kick-off control unit for adjusting the feedback current during a kick-off period for starting the load.

22 Claims, 3 Drawing Sheets

INVERTER AND INVERTER DRIVING METHOD FOR ENABLING SOFT START OF A LOAD

This application claims the benefit of the Korean Patent Application No. 10-2004-0078665, filed on Oct. 4, 2004, which is hereby incorporated by reference as if fully set forth herein.

BACKGROUND OF THE INVENTION

1. Field of the Invention

The present invention relates to an inverter and inverter driving method, and more particularly, to an inverter and inverter driving method for enabling soft start of a load to prevent improper operation of the inverter.

2. Discussion of the Related Art

An inverter is a voltage supply apparatus converting DC voltage into AC voltage. An inverter is broadly used for household appliances including washing machines as well as display devices such as a monitor and a TV. Particularly, an inverter transformer is widely used as a high voltage generator for turning on and off a discharging tube broadly used for inverter stands, fluorescent stabilizer, monitor, notebook computer, and so on.

An inverter driving circuit is necessary since an inverter is driven through an outside control method such as Pulse Width Modulation (PWM).

Hereinafter, an inverter of related art is explained referring to the accompanying drawings.

FIG. 1 is a circuit diagram illustrating an inverter connected to a load, such as a Cold-Cathode Fluorescent Lamp (CCFL) for a TFT-LCD.

As shown in FIG. 1, an inverter of the related art comprises an inverter driving circuit 10 and a transformer 20. The inverter driving circuit 10 comprises a inverter control unit 11, a transistor Q1, and a resistor R1. The transformer 20 converts DC voltage supplied after an electric source is turned on by a controller (not shown) into AC voltage to be provided for a lamp 30. The lamp 30 operates by receiving the AC voltage supplied by the transformer 20. Lamp current is provided to the inverter control unit 11 as a feedback. The inverter control unit 11 controls the transistor Q1 according to the level of the feedback lamp current from the lamp 30, thereby controlling the output voltage of the transformer 20.

Hereinafter, operation of the inverter driving circuit 10 is explained.

First, the inverter control unit 11 supplies a pulse signal having a predetermined duty ratio to the gate of the transistor Q1. Brightness of the lamp 30 may be controlled by changing the duty ratio of the pulse signal. When the transistor Q1 is turned on by the pulse signal supplied to the gate of the transistor Q1, DC voltage B+ is inputted to the transformer 20 with a certain interval. The transformer 20 converts the DC voltage B+ into AC voltage according the number of turns in its primary and secondary windings. The AC voltage outputted from the transformer 20 is provided to the inverter control unit 11 as a feedback. Subsequently, the inverter control unit 11 varies the pulse width of the pulse signal to be supplied to the gate of the transistor Q1, thereby controlling the output voltage of the transformer 20 within a predetermined range.

Referring to FIG. 2, when the inverter is turned on, a kick-off period is needed to start the lamp, during which time maximum lamp voltage and lamp current should be supplied to the lamp. For this, the inverter control unit 11 varies the frequency of the pulse signal by changing the resistance of the resistor R1 so that the high output voltage of the transformer 20 may be provided to the lamp 30 during the kick-off period. Typically, when 600-700 V is needed for usual operation of the lamp 30, 1600-1700 V is needed during the kick-off period.

In summary, during the kick-off period, high output voltage from the transformer 20 is supplied to the lamp 30 for starting the lamp 30, and then the feedback lamp current from the lamp 30 is provided to the inverter control unit 11. Based on the feedback lamp current from the lamp 30, the inverter control unit 11 controls the resistor R1 and the transistor Q1 to provide the lamp 30 with an appropriate level of voltage and current.

However, the inverter of the related art has problems as follows.

First, since the output voltage from the transformer 20 is considerably high during the kick-off period, the lamp current level is also raised. Due to the raised lamp current level, the output voltage of the transformer 20 may be raised to deviate from the predetermined range. Thus, the lamp 30 may be turned off when it should be on.

Secondly, as it is required to provide a considerably high level of voltage to the lamp 30 during the kick-off period, the DC input voltage B+ of the transformer 20 may have a level lower than that required for the high level of AC output voltage to be supplied to the lamp 30. This may also cause improper operation of the inverter and unwanted turning off of the lamp 30.

SUMMARY OF THE INVENTION

Accordingly, the present invention is directed to an inverter and inverter driving method that substantially obviates one or more problems due to limitations and disadvantages of the related art.

An object of the present invention is to provide an inverter and inverter driving method for enabling soft start of a load to prevent improper operation of the inverter.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an inverter according to the present invention includes a transformer for converting a DC input voltage into an AC output voltage, an inverter control unit for controlling a level of the AC output voltage from the transformer in response to a feedback current from a load driven by the AC output voltage, and a kick-off control unit for adjusting the feedback current during a kick-off period for starting the load.

It is desirable that the kick-off control unit adjusts the feedback current by adding a predetermined level of current thereto.

It is desirable that the kick-off period is 0.1-1 second.

It is desirable that the inverter further comprises an error amplifier having inverting and non-inverting inputs, the error amplifier comparing the feedback current received through the inverting input, with a first reference voltage signal received through the non-inverting input, and outputting a first comparison signal, and a comparator having inverting and non-inverting inputs, the comparator comparing the first comparison signal received through the non-inverting input, with a second reference voltage signal received through the inverting input, and outputting a second comparison signal.

It is further desirable that the kick-off control unit provides a predetermined level of current to the inverting input of the error amplifier during the kick-off period.

It is further desirable that the kick-off control unit comprises a transistor for controlling the introduction of the predetermined level of current to the inverting input of the error amplifier and a logic circuit for controlling the transistor's on and off times by outputting an output control signal to a gate of the transistor.

It is even further desirable that the kick-off control unit further comprises a reference saw-tooth waveform generator for generating a reference saw-tooth waveform signal and a compensator for compensating the level of the feedback current from the load and for outputting a composite of the output control signal from the logic circuit and the reference saw-tooth wave form signal.

It is desirable that the inverter control unit controls the level of the AC output voltage from the transformer in such a way that current to be supplied to the load gradually increases within a range less than a predetermined maximum level during the kick-off period.

It is desirable that the inverter further comprises a transistor connected to the transformer, the transistor determining supply of the DC input voltage to the transformer under control of the inverter control unit.

It is further desirable that inverter control unit generates a pulse signal to be supplied to a gate of the transistor.

It is further desirable that the inverter control unit controls the level of the AC output voltage from the transformer by varying frequency of the pulse signal.

It is even further desirable that the inverter control unit varies the frequency of the pulse signal by changing the resistance of a resistor connected thereto.

It is desirable that the load is a Cold-Cathode Fluorescent Lamp (CCFL) used as a backlight for a TFT-LCD.

In another aspect of the present invention, an inverter driving method includes converting a DC input voltage into an AC output voltage, adjusting a feedback current from a load driven by the AC output voltage during a kick-off period for starting the load, and controlling a level of the converted AC output voltage according to the adjusted feedback current.

It is desirable that adjusting the feedback current comprises adding a predetermined level of current to the feedback current from the load.

It is desirable that the kick-off period is 0.1-1 second.

It is desirable that controlling the level of the converted AC output voltage comprises gradually increasing a current to be supplied to the load within a range less than a predetermined maximum level during the kick-off period.

It is desirable that controlling the level of the converted AC output voltage is performed by using Pulse Width Modulation (PWM).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
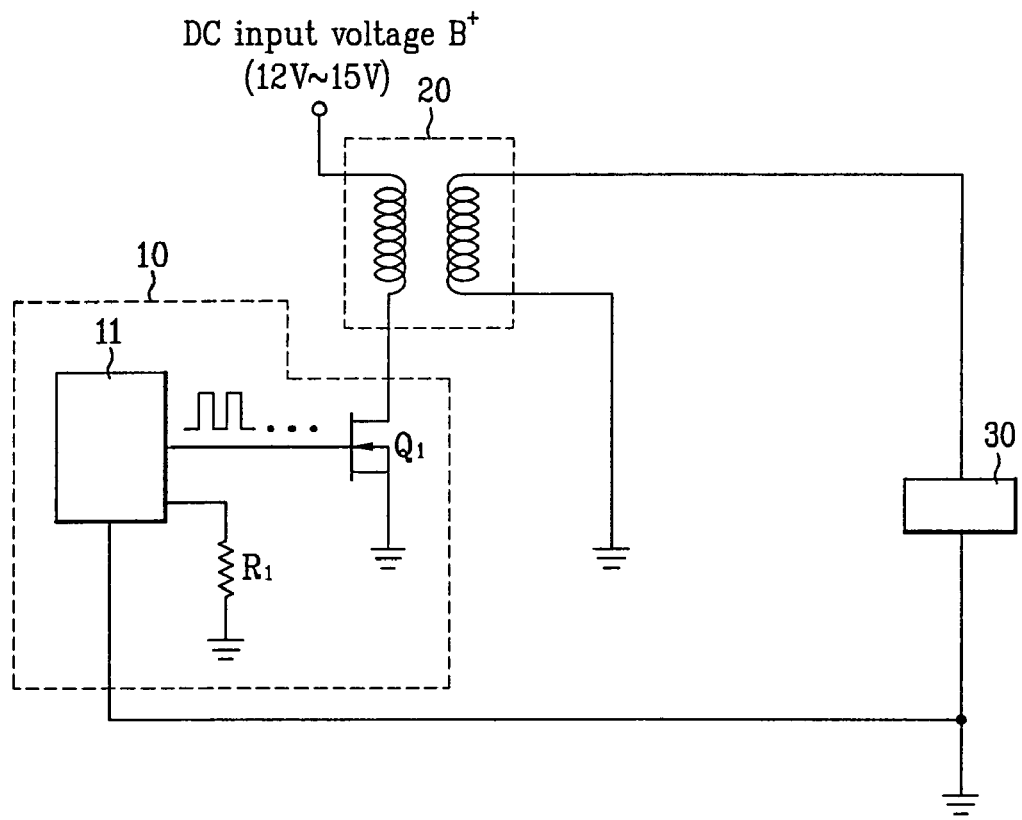
FIG. 1 is a circuit diagram illustrating an inverter of related art.
Figure 2:
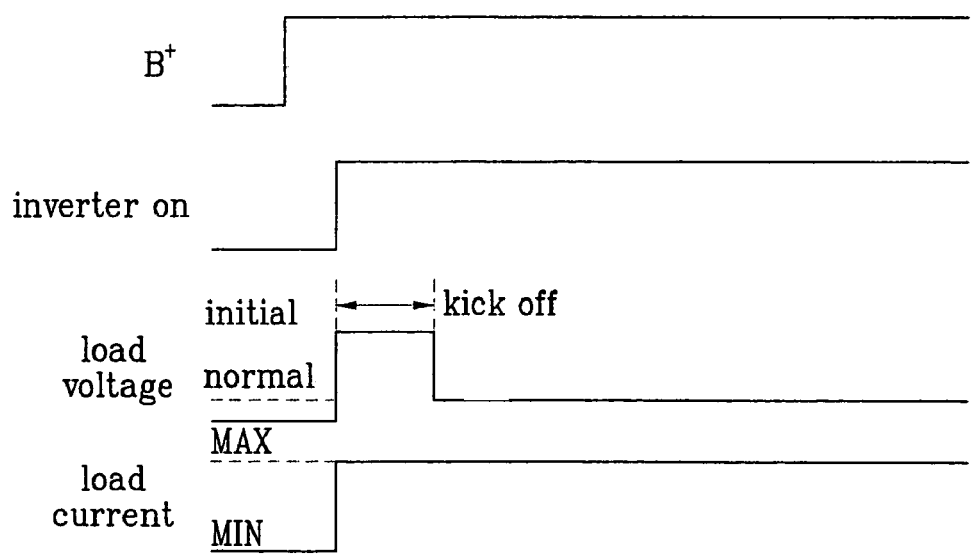
FIG. 2 is a graph for explaining operation waveforms of an inverter of related art.
Figure 3:
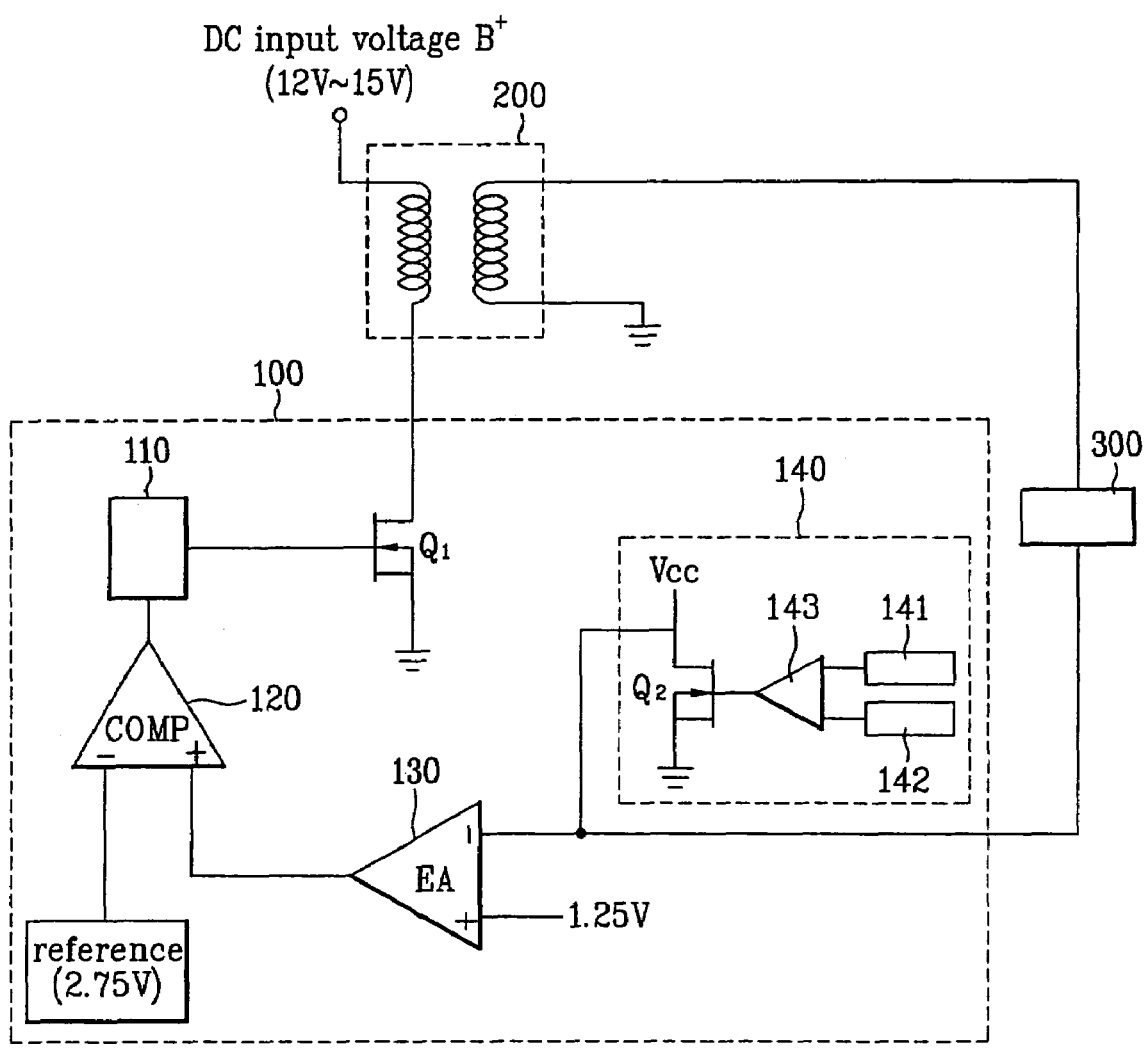
FIG. 3 is a circuit diagram illustrating an inverter according to the present invention.
Figure 4:
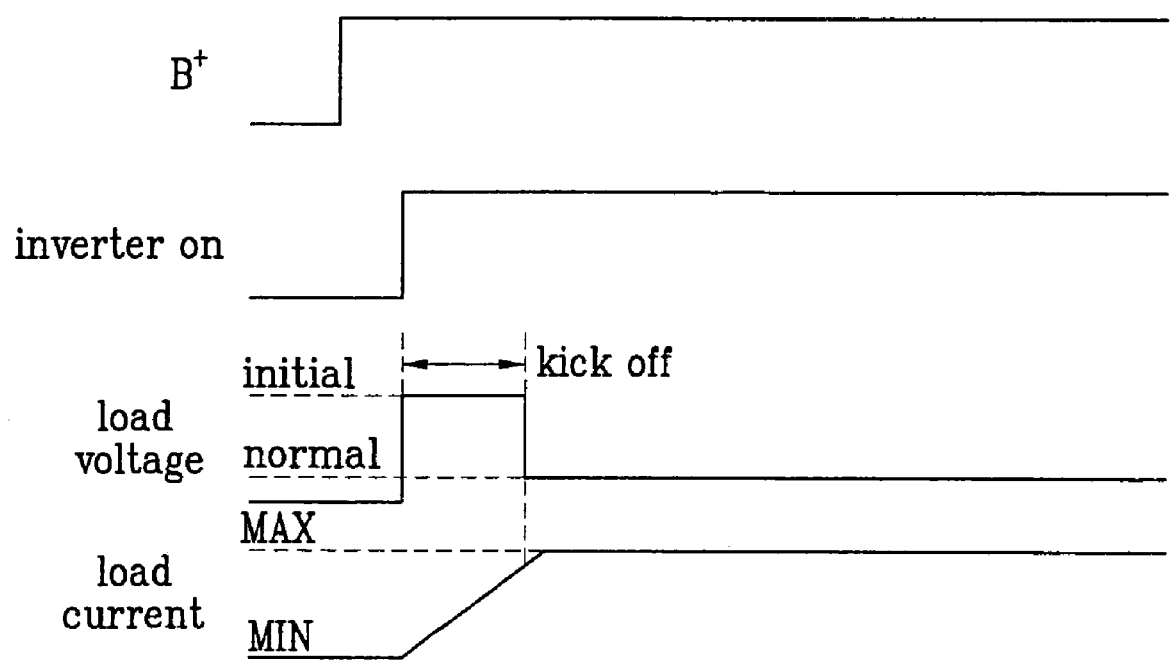
FIG. 4 is a graph for explaining operation waveforms of an inverter according to the present invention.

FIG. 3 is a circuit diagram illustrating an inverter according to the present invention and FIG. 4 is a graph for explaining operation waveform of an inverter according to the present invention.

Referring to FIG. 3, the inverter according to the present invention comprises a transformer 200 having a primary to receive a DC input voltage and a secondary to supply an AC output voltage to a lamp 300 connected to the secondary, and an inverter driving circuit 100, connected to the primary of the transformer 200, for controlling the AC output voltage from the secondary of the transformer 200 according to a feedback current from the lamp 300.

The inverter driving circuit 100 of the present invention comprises a transistor Q1, an error amplifier (EA) 130, a comparator (COMP) 120, an inverter control unit 110, and a kick-off control unit 140.

The transistor Q1 determines the supply of the DC input voltage to the primary of the transformer 200 under the control of the inverter control unit 110.

The error amplifier 130 receives the feedback current from the lamp 300 and a first reference voltage signal through an inverting input and a non-inverting input, respectively, compares the feedback current with the first reference voltage, and outputs a first comparison signal.

The comparator 120 receives the first comparison signal from the error amplifier 130 and a second reference voltage through an inverting input and a non-inverting input, respectively, compares the first comparison signal with the second reference voltage, and outputs a second comparison signal.

The inverter control unit 110 receives the second comparison signal from the comparator 120, and controls the transistor Q1 for controlling the AC output voltage from the secondary of the transformer 200 based on the second comparison signal, thereby driving the lamp 300 and controlling the brightness of the lamp 300.

The kick-off control unit 140 adds a predetermined level of current to the feedback current from the lamp 300 during the kick-off period required to start the lamp 300. The kick-off control unit 140 comprises a transistor Q2 for controlling the introduction of the predetermined level of current to the inverting input of the error amplifier 130, and a logic circuit 141 for controlling the transistor Q2.

According to the preferred embodiment of the present invention, the output signal from the logic circuit 141 for controlling the transistor Q2 is inputted to a compensator 143. The compensator 143 compensates the level of the feedback current from the lamp 300 by outputting a composite of the output signal from the logic circuit 141 and a reference saw-tooth waveform signal generated by a reference saw-tooth waveform generator 142, where the logic output signal corresponds to a kick-off period and the reference saw-tooth waveform signal corresponds to a soft start.

According to the preferred embodiment of the present invention, the lamp 300 used as a load is a Cold-Cathode Fluorescent Lamp (CCFL) generally used as a backlight for a TFT-LCD. The inverter of the present invention may be applied to other electric devices such as a washing machine.

Below is the detailed explanation of the operation of the inverter according to the present invention.

When a control signal to drive the lamp 300 is supplied, the inverter control unit 110 turns on the transistor Q1 by supplying pulse signal of a certain duty ratio to the gate of the transistor Q1, thereby supplying the DC output voltage B+ to the primary of the transformer 200. In response to the DC input voltage B+ supplied to the primary, the transformer 200 transmits the AC output voltages to the lamp 300 through its secondary, thereby driving the lamp 300. The lamp current used for driving the lamp 300 is inputted to the inverting input of the error amplifier 130 as a feedback current. The error amplifier 130 compares the feedback current from the lamp 300 with a reference voltage signal inputted through its non-inverting input and outputs a first comparison signal. The first comparison signal is inputted to the non-inverting input of the comparator 120. Then, the comparator 120 compares the first comparison signal with a reference voltage signal inputted through its inverting input and outputs a second comparison signal. The second comparison signal is inputted to the inverter control unit 110. The inverter control unit 110 varies the duty ratio of the pulse signal to be supplied to the gate of the transistor Q1 by changing the resistance of the resistor R1 based on the second comparison signal. In this way, the inverter control unit 110 controls the level of the AC output voltage outputted from the secondary of the transformer 200 to be within a predetermined range.

As shown in FIG. 4, a kick-off period is needed for starting the lamp 300 during which time high voltage should be supplied to the lamp 300. Assuming a voltage of 600-700 V is supplied for normal operation of the lamp 300, 1600-1700 V should be initially applied.

If the kick-off period is less than 0.1 sec., an initial display may appear as a flash. On the other hand, if the kick-off period is more than 1 sec., a user may feel the display is being illuminated too slowly, which is undesirable as well. Therefore, it is preferable that the kick-off period is 0.1-1 second.

During the kick-off period, the inverter control unit 110 varies the duty ratio of the pulse signal by changing the resistance of the resistor R1, thereby increasing the AC output voltage to be supplied to the lamp 300. Meanwhile, the kick-off control unit 140 adds a predetermined level of current to the feedback current from the lamp 300 to be inputted to the inverting input of the error amplifier 130.

To explain in more detail, during the kick-off period, the logic circuit 141 turns off the transistor Q2, to supply the predetermined level of current to the inverting input of the error amplifier 130. According to the preferred embodiment of the present invention, the level of the feedback current from the lamp 300 is compensated by the compensator 143 based on the output control signal from the logic circuit 141 and the reference saw-tooth waveform signal from the reference saw-tooth waveform generator 142.

In this manner, the inverter control unit 110 recognizes that overcurrent is applied to the lamp 300 since a higher level of current than the actual feedback current from the lamp 300 is inputted to the error amplifier 130. Accordingly, the inverter control unit 110 controls the AC output voltage from the transformer 200 by varying the duty ratio of the pulse signal to be supplied to the gate of the transistor Q1, such that proper level of current may be supplied to the lamp 300. Consequently, the inverter control unit 110 gradually increases the lamp current while remaining within a range that is less than a predetermined maximum level.

As described above, the inverter and inverter driving method according to the present invention enables soft start of the lamp to prevent improper operation of the inverter.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An inverter driving circuit for enabling soft start of a load driven by an AC output voltage from a transformer, the inverter driving circuit comprising:
    an inverter control unit for controlling a level of the AC output voltage according to a level of a feedback current from the load; and
    a kick-off control unit for adjusting the level of the feedback current by adding a predetermined level of current to the feedback current during a kick-off period for starting the load.

2. The inverter driving circuit of claim 1, wherein the kick-off period is 0.1-1 second.

3. The inverter driving circuit of claim 1, further comprising:
    an error amplifier having an inverting input for receiving the feedback current and a non-inverting input for receiving a first reference voltage signal, the error amplifier for outputting a first comparison signal based on a comparison of the feedback current and the first reference voltage signal; and
    a comparator having an inverting input for receiving a second reference voltage signal and a non-inverting input for receiving the first comparison signal, the comparator for outputting a second comparison signal based on a comparison of the first comparison signal and the second reference voltage signal.

4. The inverter driving circuit of claim 3, wherein the inverter control unit controls, according to the second comparison signal, the level of the AC output voltage during the kick-off period by gradually increasing a current to be supplied to the load.

5. The inverter driving circuit of claim 3, wherein the predetermined level of added current is applied to the inverting input of the error amplifier.

6. The inverter driving circuit of claim 5, wherein the kick-off control unit comprises;
    a transistor for controlling an introduction of the predetermined level of added current to the inverting input of the error amplifier; and
    a logic circuit for controlling on and off times of the transistor.

7. The inverter driving circuit of claim 6, wherein the kick-off control unit further comprises:
    a reference saw-tooth waveform generator for generating a reference saw-tooth waveform signal; and
    a compensator for compensating the level of the feedback current from the load and for outputting a composite of an output control signal from the logic circuit based on the reference saw-tooth waveform signal.

8. The inverter driving circuit of claim 1, wherein the inverter control unit controls the level of the AC output voltage during the kick-off period by gradually increasing a current to be supplied to the load within a range less than a predetermined maximum level.

9. The inverter driving circuit of claim 8, further comprising:
an error amplifier, having an inverter input for receiving the feedback current and a non-inverting input for receiving a first reference voltage signal, the error amplifier for outputting a first comparison signal based on a comparison of the feedback current and the first reference voltage signal; and
a comparator, having an inverting input for receiving a second reference voltage signal and a non-inverting input for receiving the first comparison signal, the comparator for outputting a second comparison signal based on a comparison of the first comparison signal and the second reference voltage signal,
wherein the level of the AC output voltage is controlled during the kick-off period according to the second comparison signal.

10. The inverter driver circuit of claim 1, wherein the load is a Cold-Cathode Fluorescent Lamp (CCFL) used as a backlight for a TFT-LCD.

11. The inverter driving circuit of claim 1, wherein the transformer has a primary supplied with a DC input voltage and a secondary outputting the AC output voltage for driving the load, and wherein the transformer converts the DC input voltage into the AC output voltage.

12. The inverter driving circuit of claim 11, wherein the inverter control unit controls the supply of the DC input voltage to the transformer.

13. The inverter driving circuit of claim 12, wherein the supply of the DC input voltage to the transformer is controlled, using pulse width modulation, so that a current to be supplied to the load gradually increases and remains, during the kick-off period, within a range that is less than a predetermined maximum level.

14. The inverter driving circuit of claim 1, further comprising:
a compensator for compensating the level of the feedback current from the load by outputting a composite of a logic output signal corresponding to the kick-off period and a reference saw-tooth waveform signal corresponding to the soft start.

15. An inverter driving method for enabling soft start of a load driven by an AC output voltage from a transformer, the inverter driving method comprising:
controlling a level of the AC output voltage according to a feedback current from the load; and
adjusting a level of the feedback current by adding a predetermined level of current to the feedback current during a kick-off period for starting the load.

16. The inverter driving method of claim 15, wherein the kick-off period is 0.1-1 second.

17. The inverter driving method of claim 15, wherein the level of the AC output voltage is controlled during the kick-off period by gradually increasing a current to be supplied to the load within a range less than a predetermined maximum level.

18. The inverter driving method of claim 15, wherein the level of the AC output voltage is controlled using pulse width modulation.

19. The inverter driving method of claim 15, wherein the load is a Cold-Cathode Fluorescent Lamp (CCFL) used as a backlight for a TFT-LCD.

20. The inverter driving method of claim 15, further comprising:
generating a first comparison signal based on a comparison of the feedback current and a first reference voltage signal; and
generating a second comparison signal based on a comparison of the first comparison signal and a second reference voltage signal,
wherein the level of the AC output voltage is controlled during the kick-off period according to the second comparison signal.

21. An inverter, comprising:
a transformer for converting a DC input voltage into an AC output voltage to drive a load; and
an inverter driving circuit comprising:
an inverter control unit for controlling a level of the AC output voltage according to a level of a feedback current from the load, and
a kick-off control unit for adjusting the level of the feedback current by adding a predetermined level of current to the feedback current during a kick-off period for starting the load.

22. The inverter of claim 21, further comprising:
an error amplifier, having an inverting input for receiving the feedback current and a non-inverting input for receiving a first reference voltage signal, the error amplifier for outputting a first comparison signal based on a comparison of the feedback current and the first reference voltage signal; and
a comparator, having an inverting input for receiving a second reference voltage signal and a non-inverting input for receiving the first comparison signal, the comparator for outputting a second comparison signal based on a comparison of the first comparison signal and the second reference voltage signal,
wherein the level of the AC output voltage is controlled during the kick-off period according to the second comparison signal.

* * * * *